Aug. 28, 1956   G. D. STOUGH   2,760,393
BOLT TENSIONING APPARATUS
Filed Dec. 14, 1953   2 Sheets-Sheet 2

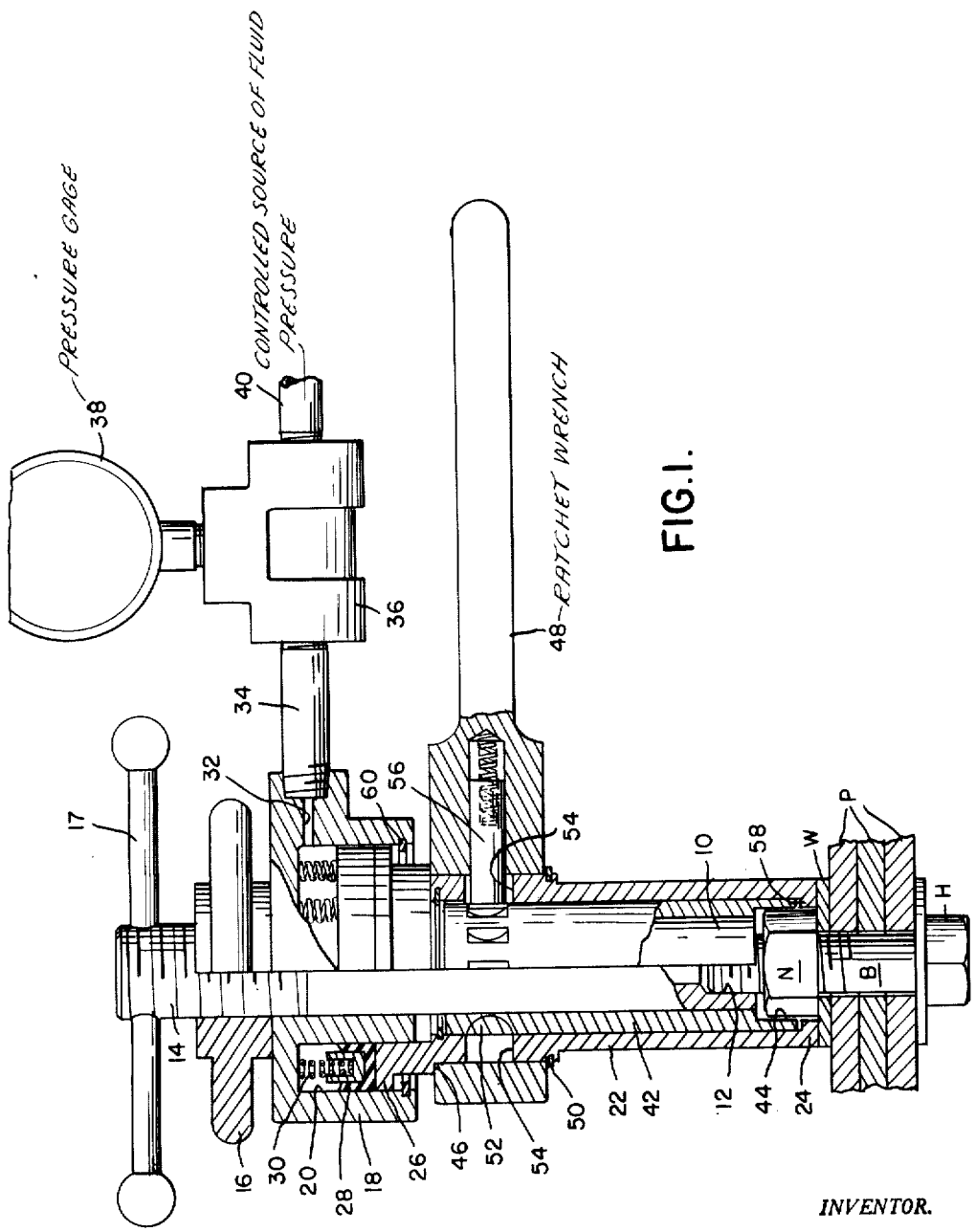

INVENTOR.
GERALD D. STOUGH
BY Whittemore,
Hulbert & Belknap
ATTORNEYS

United States Patent Office

2,760,393
Patented Aug. 28, 1956

2,760,393
BOLT TENSIONING APPARATUS

Gerald D. Stough, Detroit, Mich., assignor to Whitehead & Kales Company, River Rouge, Mich., a corporation of Michigan Application December 14, 1953, Serial No. 397,883

21 Claims. (Cl. 81—54)

The present invention relates to apparatus for pretensioning a bolt and tightening a nut thereon.

The problem of setting up a predetermined tension in a nut and bolt assembly has in the past presented many difficulties. One method practiced in the attempt to produce a predetermined tension in an assembly secured together by a nut and bolt has been the use of a so-called torque wrench to apply a predetermined torque to the nut and thus supposedly to set up a corresponding predetermined tension in the bolt. This however, has had the practical objection that it establishes a relatively high torque in the bolt so that after the nut has been tightened down, there is a tendency for the bolt to "unwind" and thus relax the tension therein. Moreover, due to variable friction it has been impossible by this method to arrive at anything like accurate control of tension set up in the bolt.

According to the present invention apparatus is provided which is effective to produce direct axial tension in the bolt without any accompanying torque or twisting effect, and to tighten the nut down on the bolted assembly while the bolt is maintained under the predetermined tension. By this method it is possible to tighten the nut down without any very great torque into solid abutment with the bolted assembly so that the nut will maintain the bolt in substantially the predetermined state of tension.

It is an object of the present invention to provide apparatus for carrying out the process characterized by the use of a piston and cylinder device for applying axial tension to the bolt.

It is a further object of the present invention to provide a bolt tensioning device including as an integral part thereof a nut rotating sleeve freely rotatable to tighten the nut while the bolt is maintained under predetermined tension.

It is a further object of the present invention to provide apparatus of the character described comprising a tension member having means for engaging the threaded end of a bolt, a pressure member relatively movable axially of the tension member and having a portion adapted to engage the assembly to be bolted together, and a piston and cylinder device connecting the pressure and tension members.

It is a further object of the present invention to provide apparatus as described in the preceding paragraph in which the piston and cylinder device comprises a cylinder and in which one end of the pressure element moves as a piston.

It is a further object of the present invention to provide apparatus as described in the preceding paragraphs in which the piston and cylinder device is in the form of an annular cylinder member surrounding the tension member and in which one end of the pressure member is movable in the annular cylinder member as a piston.

It is a further object of the present invention to provide apparatus of the character described comprising a tension member having means for rigidly connecting it to the threaded end of a bolt, a pressure member surrounding the tension member and having one end engageable with the assembly to be bolted together, means for effecting relative movement between the pressure and tension members to tension the bolt, and a nut socket intermediate the tension and pressure members freely rotatable to effect tightening of the nut while the bolt is maintained under pressure.

It is a further object of the present invention to provide apparatus as described in the preceding paragraph in which the nut socket member is in the form of a sleeve, and means are provided for rotating the sleeve operable through an opening provided in the side of the pressure member.

Other objects and features of the invention will become apparent as the description proceeds, especially when considered in conjunction with the accompanying drawings, wherein:

Figure 1 is a side elevation partly in section of bolt tensioning and nut tightening apparatus.

Figures 2, 3, 4:
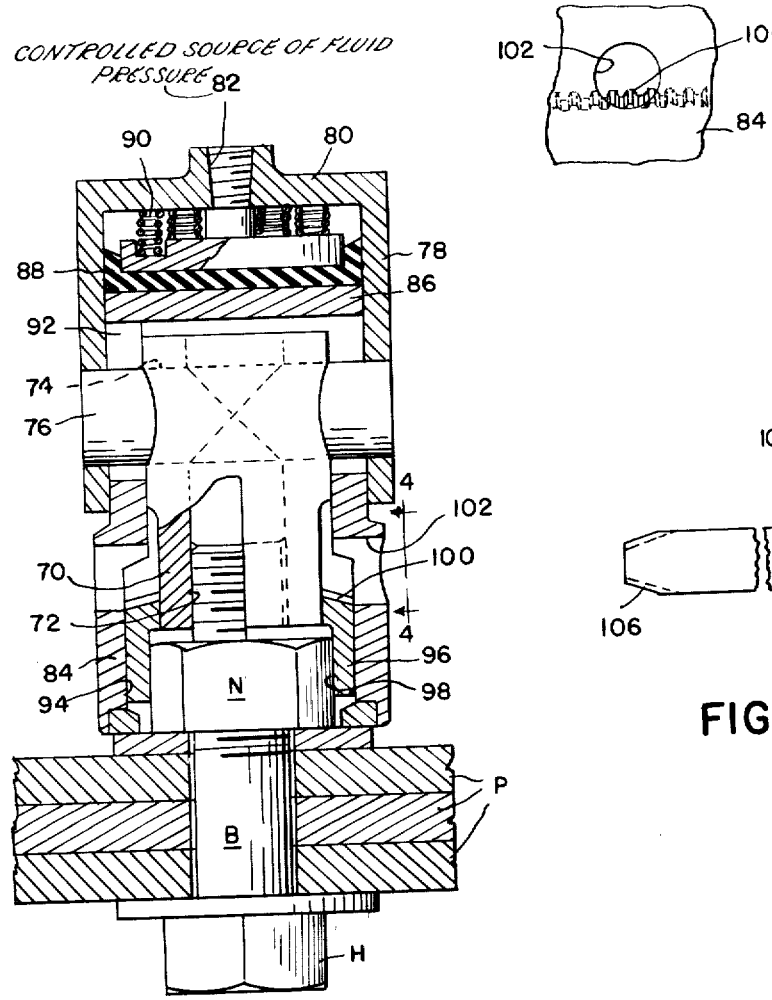
Figure 2 is a vertical section through a modified form of bolt tensioning and nut tightening apparatus.
Figure 3 is a side elevational view of a tool for use with the apparatus illustrated in Figure 2.
Figure 4 is a fragmentary elevational view taken on the line 4—4, Figure 2.

Referring now to Figure 1 there is illustrated a bolt B having a head H and having associated therewith a conventional nut N. The nut and bolt are illustrated as clamping together three apertured plates P, and in the illustrated assembly a washer W is provided beneath the nut N and engaging the uppermost plate P.

Associated with the bolt B is an elongated cylindrical tension member 10 having at its lower end a threaded recess 12 adapted to threadedly engage the outer or upper end of the bolt B. At its upper end the tension member 10 is threaded as indicated at 14, and has adjustably carried thereby a nut-like adjustable abutment 16. At its upper end the tension member 10 is provided with a transverse bar 17 for effecting rotation of the tension member to thread it onto the end of the bolt B. Slidably mounted on the upper portion of the tension member 10 below the abutment 16 is an annular cylindrical member 18 having an annular cylinder space 20 formed therein.

Surrounding and spaced outwardly from the tension member 10 is a tubular pressure member 22 the lower end of which, as illustrated at 24, engages the assembly of plates P, or the washer W associated therewith if the washer is employed. At its upper end the pressure member 22 has an enlarged annular piston portion 26 relatively movable in the cylinder space 20. Suitable sealing means indicated generally at 28 are provided and springs 30 are interposed between the sealing means 28 and the inner wall of the annular cylinder space.

The cylinder member 18 is provided with a passage 32 to the outer end of which is connected a conduit 34 which in turn is connected to a fitting 36 carrying a pressure gauge 38. A conduit 40 leads to a source of fluid pressure which may be suitably controlled by pressure regulating means or a pressure regulating valve to admit fluid under pressure to the interior of the cylinder space 20. The effect of admission of pressure to the interior of the cylinder space is to set up forces tending to move the tension member 10 upwardly and to move the pressure member 22 downwardly. It will be appreciated that the pressure within the cylinder space 20 urges cylinder member 18 upwardly into engagement with the adjustable abutment 16 and thereby applies upwardly directed forces to the upper end of the tension member 10. At the same time the pressure acting against the piston 26 of the pressure member 22 urges that member 22 downwardly into engagement with the washer W or the uppermost plate P if the washer is omitted. By this means a predetermined direct force is applied axially of the bolt B which establishes a predetermined tension therein without at the same time producing any torque or twisting effect.

It was previously noted that the tubular pressure member 22 surrounded and was spaced outwardly from the tension member 10. In the space intermediate the tension member 10 and the pressure member 22 is a sleeve 42 the lower end of which is socket shaped as indicated at 44 to cooperate with the nut N.

The pressure member 22 is provided adjacent its upper end with a shoulder 46 and a ratchet wrench indicated generally at 48 bears against said shoulder 46 and is retained in engagement therewith by suitable means such for example as the split retainer ring 50. The sleeve 42 is provided with a plurality of ratchet recesses 52 and the side wall of the pressure member 22 is provided with circumferentially enlarged openings 54 through which a spring pressed plunger 56 of the wrench 48 extends.

The socket 42 is retained in assembled position by an inwardly extending annular shoulder 58 provided at the lower end of the pressure member 22 and by a split connector ring 60.

It is obvious that when tension is applied to the bolt by the admission of pressure into the interior of the cylinder space 20, the sleeve 42 remains freely rotatable and may be rotated by back and forth oscillation of the ratchet wrench 48 to tighten the nut N down snugly into engagement with the upper surface of the assembly to be bolted together. No particular force is required in operation of the ratchet wrench 48 and it is contemplated that the nut will be brought down with only sufficient force to take up snugly so that when the apparatus is removed, the tension of the bolt will be maintained between the nut N and the head H of the bolt.

Referring now to Figures 2–4 there is illustrated a modified apparatus for tensioning a bolt B having a head H and for tightening down the nut N. In this case there is provided a tension member 70 the lower end of which is internally threaded as indicated at 72, for engagement with the upper threaded end of the bolt B. At its upper end the tension member 70 is provided with an opening 74 therethrough in which is received a pin 76. Located above the upper end of the tension member 70 is a cuplike cylinder member 78 having its upper end closed by a transverse wall 80 and having its lower end open and supporting the upper end of the tension member 70. The upper transverse wall 80 of the cylinder is provided with a tapped opening 82 for connection to a controlled source of fluid pressure as in the embodiment of the invention previously described.

Surrounding the tension member 70 is a generally tubular pressure member 84 having a transverse upper wall 86 movable in the cylinder 78 as a piston. Suitable sealing means indicated generally at 88 are provided above the wall 86 and compression spring means indicated generally at 90 are provided tending to effect relative movement between the piston and cylinder. The side walls of the cylinder 78 are apertured to receive the ends of pins 76 and thus to establish a rigid connection between the cylinder 78 and the tension member 70. The side walls of the pressure member 84 are provided with vertically elongated slots 92 to permit relative movement of the pins vertically in the slots.

Adjacent its lower end the pressure member 84 is flared outwardly to provide an annular space 94 intermediate the pressure and tension members 84 and 70 respectively. Within this annular space is a sleeve 96 having a socket 98 therein engageable with the nut N. The upper end of the sleeve 96 is provided with bevel teeth 100 and the side wall of the pressure member 84 is provided with one or more openings 102 which register with the bevel teeth 100 of the sleeve 96. Associated with the apparatus thus far described is a wrench 104 including bevel teeth 106 on one end thereof insertable through the openings 102 into meshed engagement with the bevel teeth 100. The opening 102 engages the shank of the wrench and supports it for rotation. The wrench is provided with a handle 108 by means of which it may be rotated.

Obviously, when the tension member 70 is threaded on the end of the bolt B above the nut N and pressure is applied between the cylinder 78 and the upper end of the pressure member 84, the pressure member is urged downwardly and the tension member is urged upwardly, thereby subjecting the bolt B to a predetermined controlled axial tension without any torque or twisting effect being exerted thereon. While the bolt is thus maintained under tension, the wrench 104 is inserted into the opening 102 so that the bevel teeth 106 thereon mesh with the bevel teeth 100 of the sleeve 96. Thereupon rotation of the wrench 104 rotates the sleeve and tightens the nut N down into snug engagement with the assembly of plates P.

The drawings and the foregoing specification constitute a description of the improved bolt tensioning apparatus in such full, clear, concise and exact terms as to enable any person skilled in the art to practice the invention, the scope of which is indicated by the appended claims.

What I claim as my invention is:

1. Apparatus for pretensioning a bolt and thereafter tightening a nut thereon, comprising a tension member having an interiorly threaded recess in one end to engage the end of a bolt beyond a nut carried thereby, a sleeve rotatable on said member and having a nut engaging socket at one end thereof, a pressure member surrounding said sleeve and movable longitudinally thereon into engagement with an assembly to be bolted together, a piston and cylinder device interconnecting said pressure and tension members, and means for rotating said sleeve while a bolt engaged by said member is under axial tension as a result of pressure applied to said device.

2. Apparatus as defined in claim 1 in which the means for rotating said sleeve comprises a ratchet wrench oscillatable about said pressure member, said pressure member having a slot therethrough, said sleeve having ratchet recesses in its periphery, and said wrench having a spring pressed plunger movable through said slot into engagement with said ratchet recesses.

3. Apparatus as defined in claim 1 in which the means for rotating said sleeve comprises a circular series of teeth on said sleeve, said pressure member having an opening in alignment with said teeth, and a toothed rotary wrench insertable through the opening into meshed engagement with the teeth on said sleeve.

4. Apparatus as defined in claim 1 in which said piston and cylinder device comprises a cylinder concentric with said tension member and surrounding the upper end thereof, a pin extending through openings in the walls of said cylinder and an opening in said tension member, a piston in said cylinder, the upper end of said pressure member being operatively connected to said piston, the side walls of said pressure member being slotted to receive said pin for relative movement longitudinally of the slots.

5. Apparatus as defined in claim 4 in which said pressure member is tubular and closed at one end, the end closure constituting the piston of said device.

6. Apparatus for pretensioning a bolt and thereafter tightening a nut thereon, comprising an elongated tension member having a bolt engaging threaded recess at one end and a threaded portion adjacent its other end, an annular adjustable abutment on said threaded portion, an annular cylinder member slidable on said tension member and engageable with the underside of said abutment, a tubular pressure member surrounding said tension member and having an annular piston portion at its upper end received in said annular cylinder member, the lower end of said pressure member extending below the lower end of said tension member and being engageable with an assembly to be clamped by a nut and bolt.

7. Apparatus as defined in claim 6 which comprises means for rotating a nut on a bolt tensioned by relative movement of said pressure and tension members.

8. Apparatus as defined in claim 7 in which said means comprises a socket member rotatable within said pressure member.

9. Apparatus as defined in claim 7 in which said means comprises a socket member rotatably received between said pressure and tension members.

10. Apparatus for pretensioning a bolt and thereafter tightening a nut thereon, comprising an elongated tension member having a bolt engaging threaded recess at one end and an annular cylinder member thereon spaced above the said one end of said tension member, a tubular pressure member surrounding said tension member and having an annular piston portion at its upper end received in said annular cylinder member, the lower end of said pressure member extending below the lower end of said tension member and being engageable with an assembly to be clamped by a nut and bolt.

11. Apparatus for pretensioning a bolt and thereafter tightening a nut thereon, comprising a tension member having a bolt engaging threaded recess at its lower end and having laterally extending pin portions adjacent its upper end, a downwardly open cup shaped cylinder member above said tension member connected to said pin portions, a downwardly open cup shaped pressure member having a closed upper end forming a piston within said cylinder member, the sides of said pressure member having slots through which said pin portions extend, the lower end of said pressure member extending below the lower end of said tension member to engage an assembly to be clamped by a bolt engaged by said tension member, and means for rotating a nut on the bolt while said tension and pressure members are moved by said cylinder member and piston to tension the bolt.

12. Apparatus as defined in claim 11 in which said means comprises a socket member rotatable within said pressure member.

13. Apparatus as defined in claim 11 in which said means comprises a socket member rotatably received between said pressure and tension members.

14. Apparatus for completing an assembly in which a bolt extends through openings in an assembly of parts and beyond one side thereof and a nut is threaded on the bolt to expose a threaded end portion of the bolt beyond the nut, said apparatus comprising a threaded member engageable with the threaded end of the bolt, a pressure member engageable with the said one side of the assembly adjacent the openings, means for relatively moving said members axially of the bolt in a direction to tension the bolt, and a rotary socket member engageable with the nut and operable to tighten the nut into engagement with the assembly while the bolt is maintained under predetermined tension by said threaded and pressure members.

15. Apparatus for completing an assembly in which a bolt extends through openings in an assembly of parts and beyond one side thereof and a nut is threaded on the bolt to expose a threaded end portion of the bolt beyond the nut, said apparatus comprising a threaded member engageable with the threaded end of the bolt, a pressure member surrounding and spaced radially outwardly from said threaded member and engageable with the said one side of the assembly adjacent the openings, means for relatively moving said members axially of the bolt in a direction to tension the bolt, and a rotary socket member intermediate said threaded member and said pressure member engagement with the nut and operable to tighten the nut into engagement with the assembly while the bolt is maintained under predetermined tension by said threaded and pressure members.

16. The method of assembling structures including apertured parts, comprising the steps of passing a bolt through apertures in the parts, threading a nut onto the end of the bolt to expose a threaded end of the bolt beyond the nut, tensioning the bolt by the direct application of force axially of the bolt to the threaded end thereof, and, while maintaining the bolt under axial tension, tightening the nut against the assembly of parts.

17. In combination, means for axially tensioning a bolt extending through and beyond an assembly of parts, including a longitudinally movable member having an interiorly threaded portion engageable with the free end of said bolt, an element carried by said longitudinally movable member, means for moving said member longitudinally including two members movable in opposite directions relative to each other, one of said two members being adapted to exert a force against said assembly of parts, the other of said two members being adapted to exert a force against the element carried by said longitudinally movable member, and means for moving said two members relative to each other, and means operable while said bolt is tensioned for tightening a nut on said bolt including a member mounted to turn relative to one of the members aforesaid and having a socket for non-rotatively receiving said nut, and means for turning said last mentioned member.

18. In combination, means for axially tensioning a bolt extending through and beyond an assembly of parts, including a longitudinally movable member having an interiorly threaded portion engageable with the free end of said bolt, an element carried by said longitudinally movable member, means for moving said member longitudinally including two members movable in opposite directions relative to each other, one of said two members being adapted to exert a force against the element carried by said longitudinally movable member and having a space forming a cylinder, the other of said two members being adapted to exert a force against said assembly of parts and having a portion operable as a piston within said cylinder, means for supplying fluid under pressure to the interior of said cylinder between the head thereof and said piston, and means operable while said bolt is tensioned for tightening a nut on said bolt including a member mounted to turn relative to one of the members aforesaid and having a socket for non-rotatively receiving said nut.

19. Apparatus for completing an assembly in which a bolt extends through openings in an assembly of parts, and a nut is threaded on said bolt between the end thereof and said assembly of parts; said apparatus comprising means for tensioning the bolt axially without applying any torque thereto, said means including a longitudinally movable member having a threaded portion engageable with the threaded end of the bolt, and means for moving said member longitudinally, and means operable while said bolt is tensioned for tightening the nut against said assembly of parts.

20. Apparatus for tensioning a bolt extending through and beyond an assembly of parts, and for subsequently tightening a nut on said bolt while such bolt is tensioned, the tensioning means including a longitudinally movable member having a portion threadedly engageable with the free end of said bolt beyond said nut, a member slidably mounted on said longitudinally movable member and having a space forming a cylinder, an abutment for the cylinder member adjustably mounted on said longitudinally movable member, a pressure member surrounding the longitudinally movable member and having a portion operable as a piston within said cylinder, said pressure member being engageable with said assembly of parts, means for supplying fluid under pressure to the interior of said cylinder between the head thereof and said piston so that a force will be exerted by said cylinder member against said abutment to move said longitudinally movable member longitudinally and thereby tensioning said bolt axially, the means operable while said bolt is tensioned for tightening said nut on said bolt including a sleeve mounted to turn on said tension member and having a socket for non-rotatively receiving said nut, and means carried by one of the members aforesaid for turning said sleeve.

21. Apparatus for tensioning a bolt extending through and beyond an assembly of parts, and for subsequently tightening a nut on said bolt while such bolt is tensioned, the tensioning means including a longitudinally movable member having a portion threadedly engageable with the free end of said bolt beyond said nut, a memmovable lengthwise of said longitudinally movable member and having a space forming a cylinder, an abutment for the cylinder member carried by said longitudinally movable member, a pressure member movable lengthwise of the longitudinally movable member and having a portion operable as a piston within said cylinder, said pressure member being engageable with said assembly of parts, means for supplying fluid under pressure to the interior of said cylinder between the head thereof and said piston so that a force will be exerted by said cylinder member against said abutment to move said longitudinally movable member longitudinally and thereby tension said bolt axially, the means operable while said bolt is tensioned for tightening said nut on said bolt including a sleeve mounted to turn on one of the members aforesaid and having a socket for non-rotatively receiving said nut.

References Cited in the file of this patent
UNITED STATES PATENTS

| | | |
|---|---|---|
| 1,631,489 | Kilwicz | June 7, 1927 |
| 2,358,249 | Portuondo | Sept. 12, 1944 |
| 2,459,671 | Morris | Jan. 18, 1949 |
| 2,562,831 | Stone | July 31, 1951 |
| 2,622,466 | Vanden Bos et al. | Dec. 23, 1952 |
| 2,694,328 | La Freniere | Nov. 16, 1954 |

UNITED STATES PATENT OFFICE
CERTIFICATE OF CORRECTION

Patent No. 2,760,393

August 28, 1956

Gerald D. Stough

It is hereby certified that error appears in the above numbered patent requiring correction and that the said Letters Patent should read as corrected below.

Column 5, line 71, for "engagement" read -- engageable --.

Signed and sealed this 12th day of June 1962.

(SEAL)
Attest:

ERNEST W. SWIDER
Attesting Officer

DAVID L. LADD
Commissioner of Patents